US012592171B2

(12) United States Patent
Püskül

(10) Patent No.: US 12,592,171 B2
(45) Date of Patent: Mar. 31, 2026

(54) VEHICULAR DRIVING ASSIST SYSTEM WITH HEAD UP DISPLAY

(71) Applicant: Magna Electronics Inc., Auburn Hills, MI (US)

(72) Inventor: Özgür Nurettin Püskül, Ellerbek (DE)

(73) Assignee: Magna Electronics Inc., Auburn Hills, MI (US)

( * ) Notice: Subject to any disclaimer, the term of this patent is extended or adjusted under 35 U.S.C. 154(b) by 232 days.

(21) Appl. No.: 18/480,686

(22) Filed: Oct. 4, 2023

(65) Prior Publication Data

US 2024/0119873 A1      Apr. 11, 2024

Related U.S. Application Data

(60) Provisional application No. 63/378,688, filed on Oct. 7, 2022.

(51) Int. Cl.
*G09G 3/00*          (2006.01)
*A63F 13/25*          (2014.01)
(Continued)

(52) U.S. Cl.
CPC ............. *G09G 3/002* (2013.01); *A63F 13/25* (2014.09); *A63F 13/803* (2014.09); *B60R 1/22* (2022.01); *G06F 3/013* (2013.01); *G06T 7/20* (2013.01); *G06T 7/70* (2017.01); *G06V 20/58* (2022.01); *G06V 20/59* (2022.01); *B60R 2300/205* (2013.01); *B60R 2300/308* (2013.01);
(Continued)

(58) Field of Classification Search
CPC ....... G09G 3/002; A63F 13/25; A63F 13/803;
A63F 13/245; A63F 13/90; B60R 1/22;
B60R 2300/205; B60R 2300/308; B60R
2300/8093; G06F 3/013; G06T 7/20;
G06T 7/70; G06V 20/58; G06V 20/59;
G06V 20/56
See application file for complete search history.

(56) References Cited

U.S. PATENT DOCUMENTS 5,550,677  A      8/1996  Schofield et al.
5,670,935  A      9/1997  Schofield et al.
(Continued)

OTHER PUBLICATIONS https://www.theverge.com/2019/6/18/18684297/tesla-arcade-model-3-hands-on-beach-buggy-racing-2-demo-electric-cars (Year: 2019).*

*Primary Examiner* — Ig T An
(74) *Attorney, Agent, or Firm* — HONIGMAN LLP

(57) ABSTRACT

A vehicular driving assist system includes a plurality of sensors disposed at a vehicle that sense exterior of an equipped vehicle. The system includes a head-up display disposed at the equipped vehicle configured to display one or more visual elements in a field of view of a driver while the driver views forward through a windshield. The system, responsive to processing at an ECU of sensor data captured by the sensors, detects another vehicle present exterior the equipped vehicle. The vehicular driving assist system displays a plurality of visual elements via the head-up display. The plurality of visual elements includes (i) a bounding box appearing to the driver to surround the detected other vehicle when the detected other vehicle is viewable by the driver through the windshield of the equipped vehicle, (ii) a current speed of the detected other vehicle and (iii) a predicted trajectory of the detected other vehicle.

24 Claims, 7 Drawing Sheets

Driver's Field of View

Abs. Speed:
80 km/h
Rel. Speed:
10 km/h

Speed:
80 km/h 54      52

50

Ego Speed:
95 km/h

Distance to front of vehicle:
50m

Distance to Barrier:
50 cm

Lane Change Not Possible

Speed:
90 km/h

56

(51) Int. Cl.

| | |
|---|---|
| *A63F 13/803* | (2014.01) |
| *B60R 1/22* | (2022.01) |
| *G06F 3/01* | (2006.01) |
| *G06T 7/20* | (2017.01) |
| *G06T 7/70* | (2017.01) |
| *G06V 20/58* | (2022.01) |
| *G06V 20/59* | (2022.01) |

(52) U.S. Cl.

CPC ................ *B60R 2300/8093* (2013.01); *G06T 2207/30201* (2013.01); *G06T 2207/30241* (2013.01); *G06T 2207/30261* (2013.01); *G06T 2207/30268* (2013.01)

(56) References Cited

U.S. PATENT DOCUMENTS

| | | | |
|---|---|---|---|
| 5,949,331 | A | 9/1999 | Schofield et al. |
| 7,038,577 | B2 | 5/2006 | Pawlicki et al. |
| 7,720,580 | B2 | 5/2010 | Higgins-Luthman |
| 7,777,611 | B2 | 8/2010 | Desai |
| 7,855,755 | B2 | 12/2010 | Weller et al. |
| 7,914,187 | B2 | 3/2011 | Higgins-Luthman et al. |
| 9,405,120 | B2 | 8/2016 | Graf et al. |
| 10,017,114 | B2 | 7/2018 | Bongwald |
| 10,065,574 | B2 | 9/2018 | Tiryaki |
| 10,958,830 | B2 | 3/2021 | Koravadi |
| 11,518,401 | B2 | 12/2022 | Kulkarni |
| 11,582,425 | B2 | 2/2023 | Liu |
| 11,639,134 | B1 | 5/2023 | Huizen et al. |
| 11,780,372 | B2 | 10/2023 | Sobecki et al. |
| 11,827,153 | B2 | 11/2023 | Miller et al. |

| | | | | |
|---|---|---|---|---|
| 2014/0336876 | A1 | 11/2014 | Gieseke et al. | |
| 2015/0009010 | A1 | 1/2015 | Biemer | |
| 2015/0015710 | A1 | 1/2015 | Tiryaki | |
| 2015/0022664 | A1 | 1/2015 | Pflug et al. | |
| 2015/0092042 | A1 | 4/2015 | Fursich | |
| 2015/0232030 | A1 | 8/2015 | Bongwald | |
| 2015/0294169 | A1 | 10/2015 | Zhou et al. | |
| 2015/0296135 | A1 | 10/2015 | Wacquant et al. | |
| 2015/0352953 | A1 | 12/2015 | Koravadi | |
| 2016/0137126 | A1 | 5/2016 | Fursich et al. | |
| 2016/0209647 | A1 | 7/2016 | Fursich | |
| 2017/0217367 | A1 | 8/2017 | Pflug et al. | |
| 2017/0274906 | A1 | 9/2017 | Hassan et al. | |
| 2018/0032997 | A1* | 2/2018 | Gordon | G06Q 30/0269 |
| 2018/0134217 | A1 | 5/2018 | Peterson et al. | |
| 2018/0137373 | A1* | 5/2018 | Rasmusson, Jr. | G05D 1/0088 |
| 2018/0222414 | A1 | 8/2018 | Ihlenburg et al. | |
| 2018/0231976 | A1 | 8/2018 | Singh | |
| 2019/0210615 | A1 | 7/2019 | Caron et al. | |
| 2020/0143546 | A1* | 5/2020 | Mehdi | G06T 7/564 |
| 2020/0143560 | A1 | 5/2020 | Lu et al. | |
| 2020/0202151 | A1 | 6/2020 | Wacquant | |
| 2020/0320320 | A1 | 10/2020 | Lynam | |
| 2021/0056306 | A1* | 2/2021 | Hu | G06V 10/764 |
| 2021/0191394 | A1* | 6/2021 | Dudley | G05D 1/0061 |
| 2021/0291739 | A1 | 9/2021 | Kasarla et al. | |
| 2021/0323473 | A1 | 10/2021 | Peterson et al. | |
| 2022/0084212 | A1* | 3/2022 | Dahal | G06N 3/08 |
| 2022/0242438 | A1 | 8/2022 | Sobecki et al. | |
| 2022/0254132 | A1 | 8/2022 | Rother | |
| 2022/0377219 | A1 | 11/2022 | Conger et al. | |
| 2024/0168355 | A1 | 5/2024 | Baur | |
| 2024/0190456 | A1 | 6/2024 | P et al. | |
| 2024/0383406 | A1 | 11/2024 | Sobecki | |

\* cited by examiner 5-10cm

VEHICULAR DRIVING ASSIST SYSTEM WITH HEAD UP DISPLAY

CROSS REFERENCE TO RELATED APPLICATION

The present application claims the filing benefits of U.S. provisional application Ser. No. 63/378,688, filed Oct. 7, 2022, which is hereby incorporated herein by reference in its entirety.

FIELD OF THE INVENTION

The present invention relates generally to a vehicle sensing system for a vehicle and, more particularly, to a vehicle sensing system that utilizes one or more cameras and/or one or more radar sensors at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular driving assist system includes a plurality of sensors disposed at a vehicle equipped with the vehicular driving assist system. The plurality of sensors sense exterior of the equipped vehicle and are operable to capture sensor data. The system includes an electronic control unit (ECU) with electronic circuitry and associated software. Sensor data captured by the plurality of sensors is transferred to and is processed at the ECU. The system includes a head-up display disposed at the equipped vehicle. The head-up display is configured to display one or more visual elements in a field of view of a driver of the equipped vehicle while the driver views forward of the equipped vehicle through a windshield of the equipped vehicle. The vehicular driving assist system, responsive to processing at the ECU of sensor data captured by the plurality of sensors and transferred to the ECU, detects another vehicle present exterior the equipped vehicle. The vehicular driving assist system, responsive at least in part to processing at the ECU of sensor data captured by the plurality of sensors, displays a plurality of visual elements via the head-up display. The plurality of visual elements includes (i) a bounding box appearing to the driver to surround the detected other vehicle when the detected other vehicle is viewable by the driver through the windshield of the equipped vehicle, (ii) a current speed of the detected other vehicle and (iii) a predicted trajectory of the detected other vehicle.

These and other objects, advantages, purposes and features of the present invention will become apparent upon review of the following specification in conjunction with the drawings.

DESCRIPTION OF THE PREFERRED EMBODIMENTS

A vehicular driving assist system or vehicular sensing system operates to capture sensor data such as images exterior of the vehicle and may process the captured sensor data to display images and to detect objects at or near the vehicle and in the predicted path of the vehicle, such as to assist a driver of the vehicle to keep within a traffic lane. The sensing system includes an image processor or image processing system that is operable to receive image data from one or more cameras and provide an output to a display device for displaying images representative of the captured image data. Optionally, the sensing system may provide a display, such as a rearview display or a top down or bird's eye or surround view display or the like.

Figure 1:
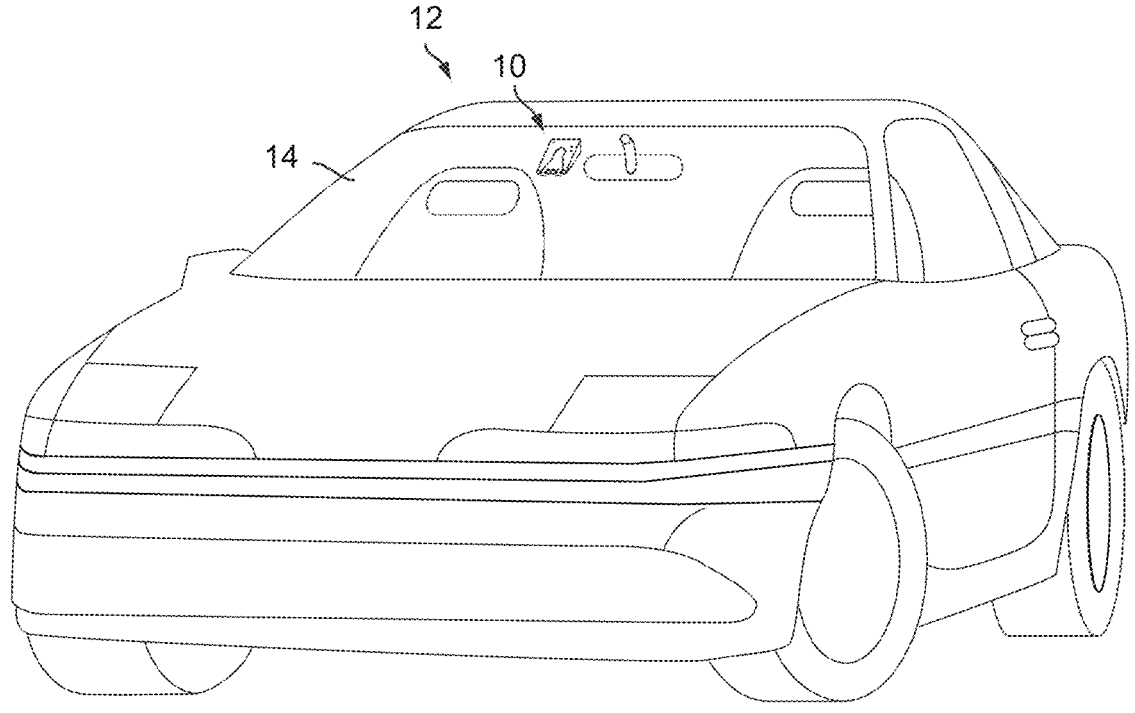
FIG. 1 is a perspective view of a vehicle with a driving assist system that incorporates multiple sensors including a camera and a radar sensor.

Referring now to the drawings and the illustrative embodiments depicted therein, a driving assist system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the driving assist system 10 includes at least one radar sensor unit, such as a forward facing radar sensor unit 16. Optionally, the system may include multiple exterior viewing imaging sensors or cameras, such as a forward viewing camera at the front of the vehicle, a sideward/rearward viewing camera at respective sides of the vehicle, a rearward viewing camera at the rear of the vehicle (which capture images exterior of the vehicle), one or more corner radar sensor units, one or more lidar sensors, one or more ultrasonic sensors, etc. The camera or cameras each include a lens for focusing images at or onto an imaging array or imaging plane or imager of the camera. The forward viewing camera is disposed at the windshield of the vehicle views through the windshield and forward of the vehicle, such as for a machine vision system (such as for traffic sign recognition, headlamp control, pedestrian detection, collision avoidance, lane marker detection and/or the like).

The radar sensor(s) may include a plurality of transmitters that transmit radio signals via a plurality of antennas. The radar sensor may also include a plurality of receivers that receive radio signals via the plurality of antennas. The received radio signals are transmitted radio signals that are reflected from an object.

The sensing system 10 includes a control or electronic control unit (ECU) having electronic circuitry and associated software, with the electronic circuitry including a data processor or image processor that is operable to process image data captured by the camera or cameras and/or sensor data captured by the radar sensors, whereby the ECU may detect or determine presence of objects or the like and/or the system provide displayed images at a display device for viewing by the driver of the vehicle. The data transfer or signal communication from the camera to the ECU may comprise any suitable data or communication link, such as a vehicle network bus or the like of the equipped vehicle.

The future of the automotive industry is moving toward autonomous driving. However, there are still many intermediate steps to be taken before full autonomous driving functions are available. Currently, level 2 and level 2+ functions are in use (e.g., adaptive cruise control, lane assist, etc.). It is anticipated that level 3 functions will be active within a few years. In the meantime, acceptance of removing control from the driver to ensure the safety of autonomous vehicles is either unavailable or very limited.

It is currently not possible for the driver to understand what a smart advanced driver assistance system (ADAS) control system is doing and what is actually being recorded via a perception system. That is, the driver currently lacks the additional information that is collected via the perception system to help enable the driver to trust or understand the system. For example, the driver may have concerns with how safe the system is, what the system actually detects, which way the ADAS function would lead a lane change, how close the vehicles in front or next to the vehicle are, and/or how many vehicles or objects are near the vehicle, etc. This information is generally available to the perception system/module of the ADAS. That is, while the vehicle has collected all the information necessary to make a decision, the collected information and the decision is not known or understood by the driver.

In some conventional systems, objects detected by the perception module are displayed on a display or screen disposed within the vehicle. Details such as the host vehicle (i.e., the equipped vehicle) speed information and the braking process of the vehicle ahead of the equipped vehicle may be displayed to the driver. However, there is much more information that may be communicated to the driver from the perception system or module. For example, the host vehicle trajectory, the trajectory of other vehicles, the relative speeds to the vehicles, the distance to the nearest vehicle, etc. is generally unknown to the driver. Thus, the driver has no reference to the assist systems and it may be difficult for the driver to build trust or understanding in the assist systems.

Implementations herein include a driving assistance system or sensing system that provides information from a perception module or other vehicular system directly to the driver of the vehicle via, for example, a head-up display (HUD). This provides the driver with the possibility to be aware of occurring events and to understand the next steps of the ADAS system may perform and the context for the decisions the ADAS system makes.

Figure 2:
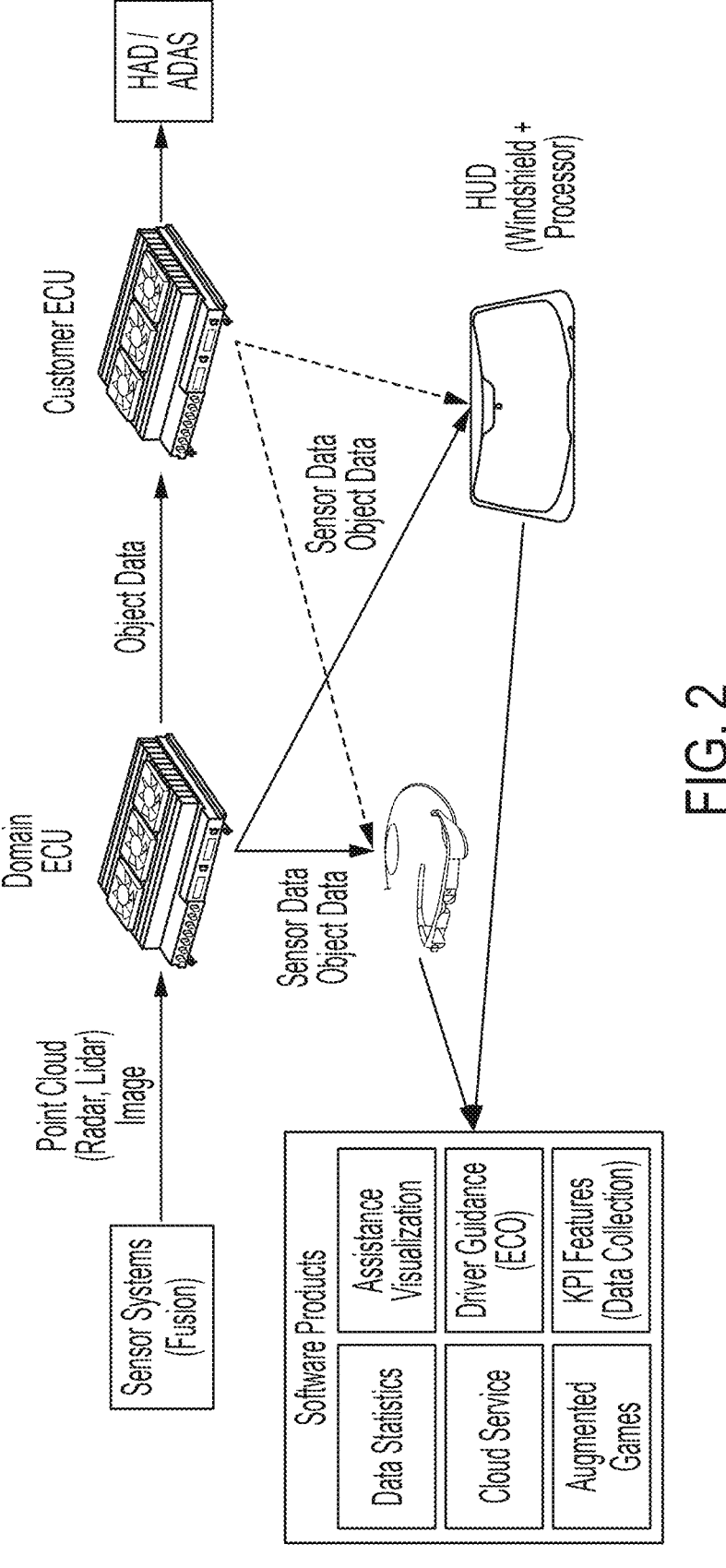
FIG. 2 is a block diagram of the driving assist system of FIG. 1.

Referring now to FIG. 2, all sensor information (e.g., sensor data captured from sensors such as one or more cameras, one or more radar sensors, lidar, ultrasonic sensors, accelerometers, etc.) is provided to the perception module (e.g., a domain ECU). The perception module determines the speeds and trajectories of nearby vehicles/objects relative to the equipped vehicle based on the sensor data (e.g., via sensor data fusion) and provides the driver with this information graphically via the head-up display. This allows the driver to directly experience the events that the perception module recognizes and to determine whether to intervene in case of danger. The system allows the driver to react faster to occurring events, because the driver may observe in real-time whether the perception system has recognized and/or interpreted the situation or environment around the vehicle correctly.

Optionally, the head-up display covers the entire field of view of the driver (e.g., extends across a majority or entirety of a windshield of the vehicle and/or one or more windows of the vehicle). In some of these examples, augmented reality (AR) functions may be added. This allows the system to provide the driver more information directly within the driving field than is otherwise normally available to the driver. Optionally, the system simulates one or more ADAS functions and perception functions on the head-up display, allowing the driver to train using any L2+ and L3 functions the system provides. For example, adaptive cruise control (ACC) is a common ADAS safety function. The system may include a simulation model where the driver can experience a first contact with the operation of ACC by, for example, simulating how the vehicle responds to changes in speed of a leading vehicle. The system may simulate any number of L2+ and L3 scenarios. The driver may be able to provide feedback to the system as a result of these scenarios (e.g., via interaction with the steering wheel, accelerator pedal, brake pedal, touch screens, voice commands, etc.) and the system may train or learn from the feedback, thus refining or updating operation of the ADAS functions. For example, the driver may manually brake the vehicle to train the system to brake earlier or harder for some scenarios. The training may be applied to a driver profile associated with the current driver of the vehicle or to all drivers of the vehicle.

Thus, in some examples, the driving assist system captures sensor data via one or more sensors and provides the sensor data to a perception module. The perception module processes the sensor data and provides outputs to a head-up display to provide visual information to the driver relating to objects the perception module detects. For example, the system displays detected objects and various parameters associated with each detected object (e.g., estimated speed, predicted trajectory, estimated distance from the equipped vehicle, etc.). The system may implement augmented reality (e.g., on a windshield and/or a window of the vehicle) to further enhance the display of information. For example, the system may overlay the estimated speed of a vehicle over the driver's view of the vehicle. The system may then react to the detected objects using one or more driving assist functions (e.g., lane keeping functions, ACC, etc.).

Because the system provides decision-making information to the driver, the system may also improve the driving experience by providing real-world driving assistance to the driver. For example, using this information, the driver may be enabled to take an optimal trajectory. The system may provide acceleration and/or braking guidance or advice. The system may provide guidance based on a driving mode the vehicle is in. For example, when the vehicle is in an economy mode (i.e., to reduce fuel consumption), the system may provide guidance to the driver on ways to optimally drive sustainably. Optionally, this information is provided to the driver via the augmented reality function.

Optionally, the system may be equipped on training vehicles for training novice drivers (e.g., at driving schools). That is, student or novice drivers may benefit from learning the concepts and operation of many L2+ and L3 functions. Using the information and guidance provided by the system, the driver may concentrate more on essential driving functions. The system may support and/or control the driver as necessary. The system may award points or other incentives to the driver based on the driving style. For example, the system may increase a score of the driver when the driver follows a leading vehicle at a proper following distance and/or deduct points when the driver follows a leading vehicle too closely. The system may determine how well the driver has responded to certain situations and whether the driver is capable of handling L2+ and L3 functions. The score may be used as a means of assessing the driving capabilities of the driver. For example, a higher score may be attributed to a more skilled driver.

Figure 3:
FIGS. 3 and 4 are views of augmented reality elements overlayed on image data captured by a camera.
Figure 4:
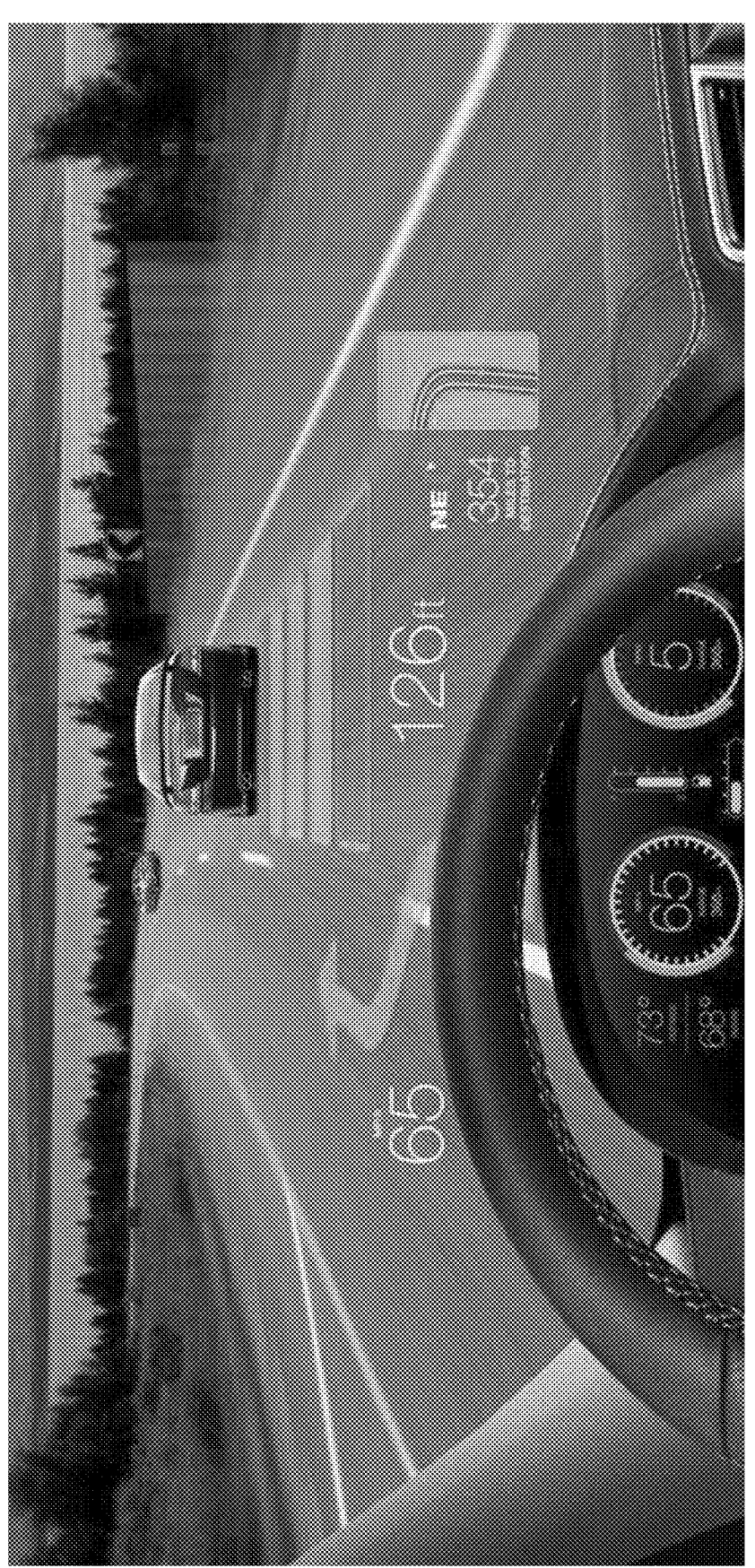

For example, and referring now to FIGS. 3 and 4, the system may support the driver when using the ACC function. The driver receives the information the perception module has gathered visually (e.g., via the head-up display or AR display) while the driver maintains a view of the road. The system may use an interior cabin camera (e.g., a driver monitoring camera) to determine a position of the driver's (or other occupants) eyes and/or gaze direction to determine the proper location of the displayed information (e.g., on the windshield and/or windows). Optionally, the AR display may include glasses or other wearable for the driver that places a transparent display directly in front of the driver's eyes. In this example, a camera disposed within the wearable may determine a gaze direction of the wearer in order to overlay the AR display elements properly with the scene the wearer views through the AR display. For example, when a leading vehicle in front of the equipped vehicle brakes, the system may visually inform the driver of the speed and distance of the vehicle (relative to the equipped vehicle) directly within the field of view of the driver (i.e., near or on top of the driver's view of the vehicle through the windshield). This allows the driver to react faster to a braking event. In some scenarios, the driver may determine a proper response to the braking event faster than the vehicle. For example, when the perception module alerts the driver that a braking maneuver has been detected and initiated via the ADAS and it is shown that a collision seems impossible, the driver may not need to react to the event because the driver is aware that everything can be taken over or handled by the ADAS (as the collision seems impossible). The AR functions may display a variety of information to the driver overlaid on the driver's view through the windshield/windows of the vehicle. For example, the information may include waypoints, distance to waypoints/destinations/detected objects (e.g., other vehicles, pedestrians, bicycles, curbs, etc.), maps, route (FIG. 3), speeds and trajectories (both relative and absolute), predicted or expected upcoming maneuvers of other vehicles or the equipped vehicle (FIGS. 4 and 5), etc. The same functions that are helpful to better navigate from one location to another can also be used by the system for a better driving experience.

Figure 5:
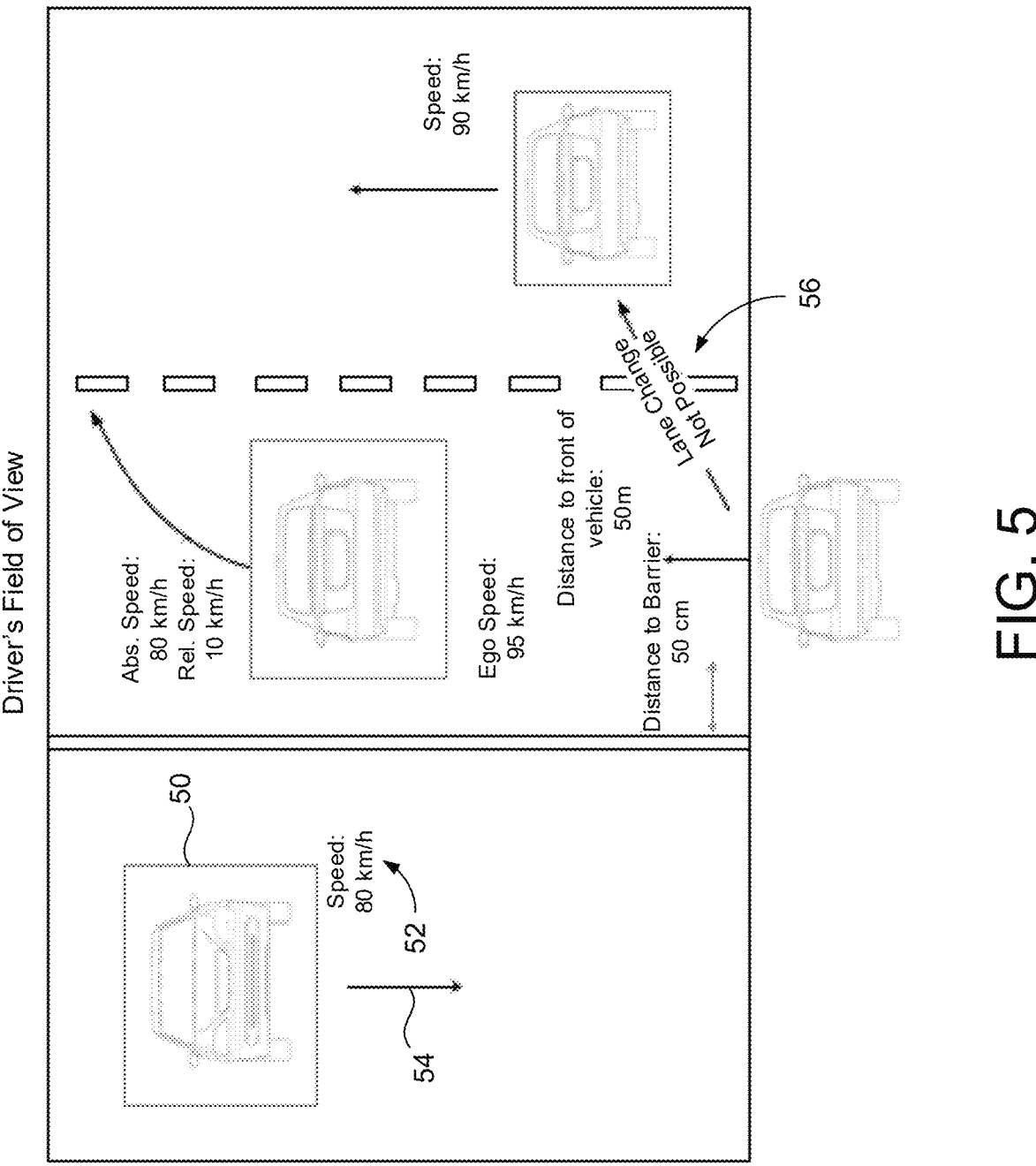
FIG. 5 is a schematic view of additional augmented reality elements.

As illustrated in FIG. 5, the AR functions may display or overlay a variety of information for the driver. For example, the AR functions may include bounding boxes 50 around detected objects of interest (e.g., other vehicles, bicycles, pedestrians, road signs, etc.). The bounding boxes may indicate a priority of the object via colors, size, flashing or other patterns, etc. For example, a pedestrian crossing the road in front of the vehicle may be bound by a red bounding box while a pedestrian waiting on a sidewalk may be bound in a green bounding box. In another example, a vehicle in a traffic lane adjacent to the equipped vehicle and traveling next to the equipped vehicle may have a different color bounding box (e.g., red instead of green) to indicate that a lane change to the occupied traffic lane is not currently possible. The AR functions may include information boxes 52 that provide information regarding detected objects, such as the speed of the objects, distance to the objects, etc. The AR functions may include trajectory predictions 54 predicting or estimating the current and/or future trajectory of the detected objects. Optionally, the AR functions include notifications 56, such as a notification that a lane change is currently not possible (e.g., due to a vehicle in an adjacent lane).

Thus, the driving assist system provides efficient data collection and functional performance testing and allows drivers to feel secure when using the automated driving functions of the system. The driver may optimize or adapt their driving behavior accordingly (e.g., direct OEM development, functions on demand). The system notifies the driver in the event of a potentially dangerous situation. The system provides additional performance for less cost (e.g., the system may enable a reduction in insurance premiums). The system optionally includes coaching/training functions to improve driving behavior. The system may include advertising functions dependent on vehicle location (e.g., determined via GPS). The system may display results for queries to the occupants of the vehicle (e.g., a search for shopping activities) and provide AR functions to navigate the user to different locations depending on the response to the query. The system may provide one or more AR games or other entertainment options using the AR functions. Additionally, the system allows the driver to continuously compare the perceptions generated by the system with the ground truth (i.e., the driver's actual perception of events) for safety and reliability concerns.

Figure 6:
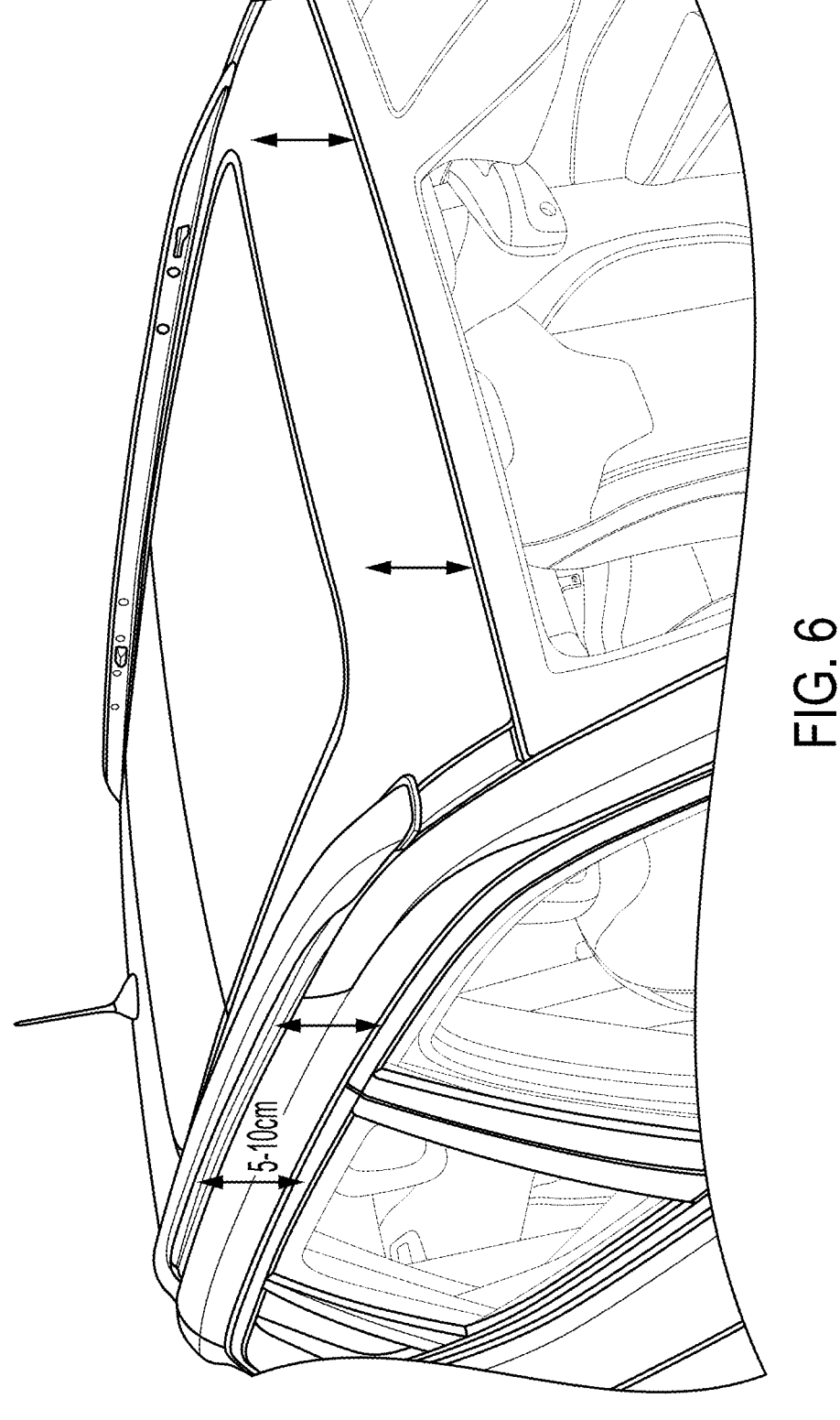
FIG. 6 is a perspective view of a portion of a vehicle for housing sensors of the driving assist system of FIG. 1.

In some implementations, the system integrates all relevant ADAS sensors and ECUs inside or into a space within or near a roof or headliner (i.e., within a 4-8 cm above the headliner). For example, the space may include lidar, cameras, and/or radar sensors. As shown in FIG. 6, the sensors may be connected directly with one or more solar panels disposed on the roof of the vehicle. The proximity of the sensors to the solar panels allows for a very short cable length. Thus, the system may implement whole sensor solutions on or near the roof of the vehicle for less power transitions. This co-location (e.g., within a hidden space area between the roof and headliner of the vehicle) helps reduce the power consumption of all of the sensors. This space allows for less environmental stress on the sensors (e.g., from rain, snow, dirt) and reduces calibration efforts. Additionally, the system allows for more generic solutions for vehicles instead of designing a new and/or custom solution for each individual car variant. That is, because most vehicles have space (e.g., 4-8 cm or 5-10 cm, etc.) between the headliner of the vehicle and the exterior roof of the vehicle, most vehicles can accommodate sensors in this area.

Figure 7:
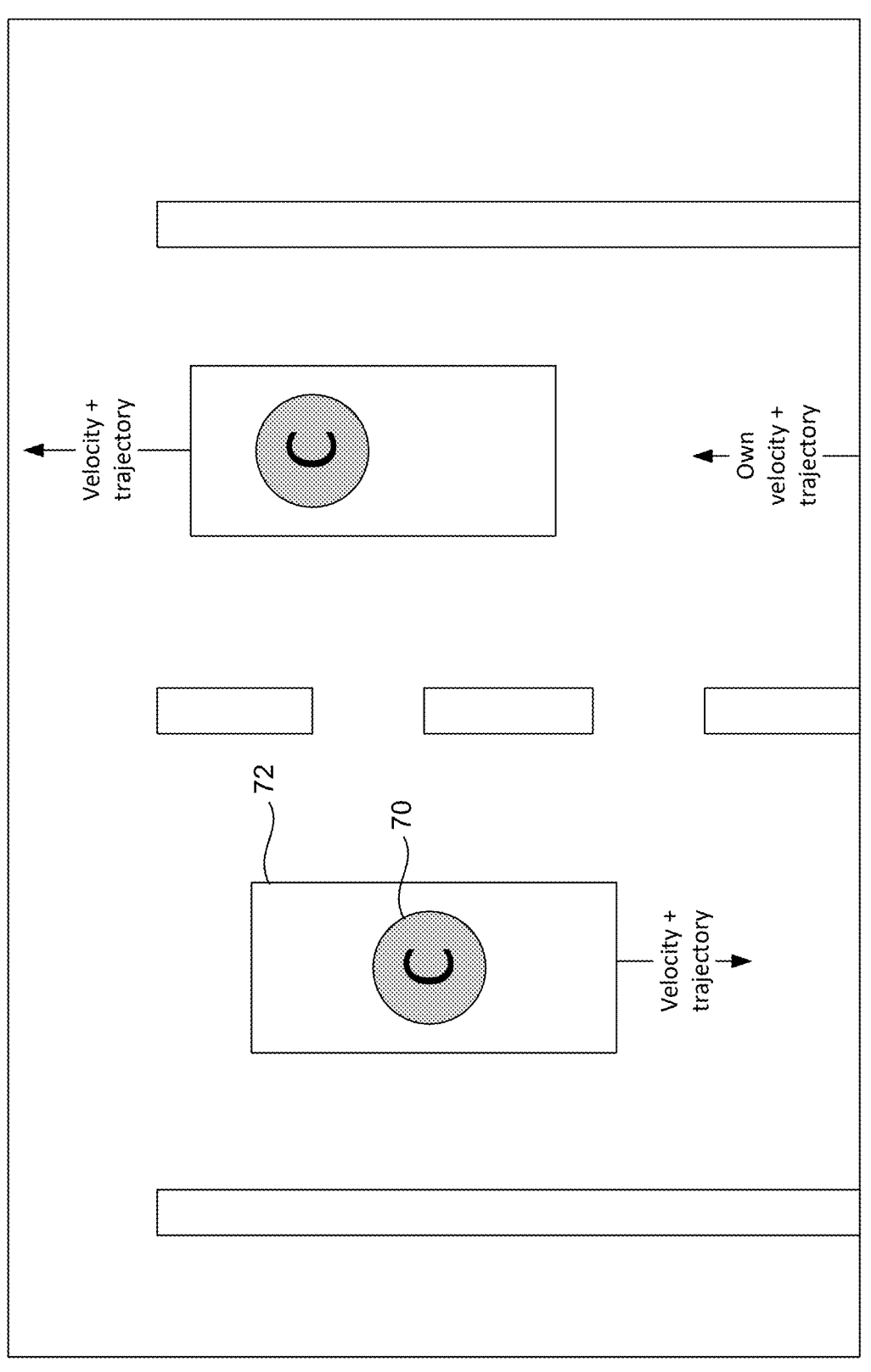
FIG. 7 is a schematic view of gamified augmented reality elements.

In some implementations, the system implements games or gamification elements using the AR functions (FIG. 7). For example, the system provides visual information of the environment around the vehicle via a head-up display. The driver can thus be directly shown the objects detected in the environment with additional information. For example, markers 70 (e.g., coins) may appear on or near the vehicles 72 and a crosshair on the head-up display may be moved by an occupant of the vehicle to collect the coins. For example, a controller or other user input may be integrated at or near a steering wheel of the vehicle, allowing the driver to interact with the visual elements displayed on the head-up display. The system may use the sensor information processed by the perception module to determine placement of the graphical elements. For example, the perception module determines all relative speeds and trajectories of nearby vehicles and allows the graphical elements (e.g., the coins) to be generated and displayed based on this information.

In vehicles where the steering wheel is electronically connected to the axle versus mechanically connected, the system may allow the steering wheel itself to act as a controller for controlling the visual elements displayed on the head-up display. For example, when the vehicle is navigating autonomously, the system may disconnect the steering wheel from control of the vehicle and instead allow the steering wheel to control elements of the game or AR functions. Optionally, when the steering wheel is electrically decoupled from control of the vehicle (e.g., during L4+ autonomous driving scenarios), AR functions may make use of ADAS sensors to create augmented scenes using the windshield and/or windows of the vehicle. The occupants of the vehicle may interact with the AR functions in a number of ways, such as via the steering wheel, touch screens, voice input, hand gestures (captured via an in-cabin camera), etc.

Thus, in some examples, the driving assist system captures sensor data via one or more sensors and provides the sensor data to a perception module. The perception module processes the sensor data and provides outputs to a head-up display to provide visual information to the driver relating to objects the perception module detects. The system may implement augmented reality (e.g., on a windshield or a window of the vehicle) to further enhance the display of information and/or to enable games or gamification elements to entertain the driver or other occupants of the vehicle. The game elements may be at least partially based on the current environment (e.g., weather, location, detected objects, etc.) around the vehicle.

The system may generate and project/display the information (including bounding boxes around vehicles) based on a determined location of the driver's eyes. Thus, the box or boxes are projected at a location so as to appear to the driver to surround the vehicle that is being viewed by the driver through the windshield of the equipped vehicle. The system may determine the driver's eye location and optionally the driver's gaze direction by utilizing aspects of driver monitoring systems or occupant monitoring systems or cabin monitoring systems and/or head and face direction and position tracking systems and/or eye tracking systems and/or gesture recognition systems. Such driver monitoring systems or occupant monitoring systems or cabin monitoring systems and/or head and face direction and/or position tracking systems and/or eye tracking systems and/or gesture recognition systems may utilize aspects of the systems described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2022/241423; WO 2022/187805 and/or WO 2023/034956, and/or PCT Application No. PCT/US2023/021799, filed May 11, 2023, which are all hereby incorporated herein by reference in their entireties.

For autonomous vehicles suitable for deployment with the system, an occupant of the vehicle may, under particular circumstances, be desired or required to take over operation/control of the vehicle and drive the vehicle so as to avoid potential hazard for as long as the autonomous system relinquishes such control or driving. Such an occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the sensing system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assist system, the vehicular driving assist system comprising:

a plurality of sensors disposed at a vehicle equipped with the vehicular driving assist system, the plurality of sensors sensing exterior of the equipped vehicle, wherein the plurality of sensors are operable to capture sensor data;

an electronic control unit (ECU) comprising electronic circuitry and associated software;

wherein sensor data captured by the plurality of sensors is transferred to and is processed at the ECU;

a head-up display disposed at the equipped vehicle, wherein the head-up display is configured to display one or more visual elements in a field of view of a driver of the equipped vehicle while the driver views forward of the equipped vehicle through a windshield of the equipped vehicle;

wherein the vehicular driving assist system, responsive to processing at the ECU of sensor data captured by the plurality of sensors and transferred to the ECU, detects another vehicle present exterior the equipped vehicle; and wherein the vehicular driving assist system, responsive at least in part to processing at the ECU of sensor data captured by the plurality of sensors, displays a plurality of visual elements via the head-up display, and wherein the plurality of visual elements comprises (i) a bounding box appearing to the driver to surround the detected other vehicle when the detected other vehicle is viewable by the driver through the windshield of the equipped vehicle, (ii) an information box appearing to visually overlay the driver's view of the detected other vehicle, wherein the information box comprises a current relative speed of the detected other vehicle relative to current speed of the equipped vehicle and (iii) a predicted trajectory of the detected other vehicle.

2. The vehicular driving assist system of claim 1, wherein a position of the plurality of visual elements on the head-up display is based on a position of the detected other vehicle relative to the equipped vehicle.

3. The vehicular driving assist system of claim 1, wherein the bounding box changes color based on location of the detected other vehicle relative to the equipped vehicle.

4. The vehicular driving assist system of claim 3, wherein the bounding box changes to a red color responsive to at least one selected from the group consisting of (i) the detected other vehicle approaching the equipped vehicle at a speed greater than a threshold speed, (ii) the detected other vehicle being within a threshold distance to the equipped vehicle, and (iii) the driver of the equipped vehicle commencing a change to an adjacent traffic lane when the detected other vehicle is present in the adjacent traffic lane.

5. The vehicular driving assist system of claim 1, wherein the plurality of sensors comprises a camera viewing exterior of the equipped vehicle, and wherein the camera comprises a CMOS imaging array having at least one million photosensors arranged in rows and columns.

6. The vehicular driving assist system of claim 5, wherein the camera is at least partially disposed in a space between a headliner of the equipped vehicle and the roof of the equipped vehicle.

7. The vehicular driving assist system of claim 5, further comprising a solar panel disposed at a roof of the equipped vehicle, and wherein the solar panel at least partially powers the camera.

8. The vehicular driving assist system of claim 1, wherein the plurality of sensors comprises at least one radar sensor sensing exterior of the equipped vehicle.

9. The vehicular driving assist system of claim 1, wherein the plurality of sensors comprises at least one lidar sensor sensing exterior of the equipped vehicle.

10. The vehicular driving assist system of claim 1, wherein the plurality of sensors comprises (i) at least one camera viewing exterior of the equipped vehicle and (ii) at least one radar sensor sensing exterior of the equipped vehicle.

11. The vehicular driving assist system of claim 1, wherein the plurality of visual elements represent a portion of an interactive game for the driver of the equipped vehicle.

12. The vehicular driving assist system of claim 11, wherein the vehicular driving assist system controls an aspect of the interactive game based on user input received from the driver of the equipped vehicle.

13. The vehicular driving assist system of claim 12, wherein, when driver-controlled steering of the equipped vehicle is electrically decoupled from controlling steering of the equipped vehicle, the user input comprises a steering wheel of the equipped vehicle.

14. The vehicular driving assist system of claim 1, further comprising an interior driver monitoring camera, the interior driver monitoring camera capturing image data, wherein image data captured by the interior driver monitoring camera is transferred to and processed at the ECU, and wherein the vehicular driving assist system, responsive to processing at the ECU of image data captured by the interior driver monitoring camera and transferred to the ECU, determines a location of the driver's eyes, and wherein the vehicular driving assist system displays the plurality of visual elements based at least in part on the determined location of the driver's eyes and a determined location of the detected other vehicle relative to the equipped vehicle.

15. The vehicular driving assist system of claim 1, wherein the vehicular driving assist system, responsive to a user input, simulates an advanced driver assist system (ADAS) function using the plurality of visual elements.

16. The vehicular driving assist system of claim 15, wherein the ADAS function comprises an adaptive cruise control function.

17. A vehicular driving assist system, the vehicular driving assist system comprising:

a plurality of sensors disposed at a vehicle equipped with the vehicular driving assist system, the plurality of sensors sensing exterior of the equipped vehicle, wherein the plurality of sensors are operable to capture sensor data, and wherein the plurality of sensors comprises (i) at least one camera viewing exterior of the equipped vehicle and (ii) at least one radar sensor sensing exterior of the equipped vehicle;

an electronic control unit (ECU) comprising electronic circuitry and associated software;

wherein sensor data captured by the plurality of sensors is transferred to and is processed at the ECU;

a head-up display disposed at the equipped vehicle, wherein the head-up display is configured to display one or more visual elements in a field of view of a driver of the equipped vehicle while the driver views forward of the equipped vehicle through a windshield of the equipped vehicle;

wherein the vehicular driving assist system, responsive to processing at the ECU of sensor data captured by the plurality of sensors and transferred to the ECU, detects another vehicle present exterior the equipped vehicle;

wherein the vehicular driving assist system, responsive at least in part to processing at the ECU of sensor data captured by the plurality of sensors, displays a plurality of visual elements via the head-up display, and wherein the plurality of visual elements comprises (i) a bounding box appearing to the driver to surround the detected other vehicle when the detected other vehicle is viewable by the driver through the windshield of the equipped vehicle, (ii) an information box appearing to visually overlay the driver's view of the detected other vehicle, wherein the information box comprises a current relative speed of the detected other vehicle relative to current speed of the equipped vehicle and (iii) a predicted trajectory of the detected other vehicle; and wherein a position of the plurality of visual elements on the head-up display is based on a position of the detected other vehicle relative to the equipped vehicle.

18. The vehicular driving assist system of claim 17, wherein the bounding box changes color based on location of the detected other vehicle relative to the equipped vehicle.

19. The vehicular driving assist system of claim 17, wherein the plurality of sensors comprises at least one lidar sensor sensing exterior of the equipped vehicle.

20. The vehicular driving assist system of claim 17, wherein the vehicular driving assist system displays the plurality of visual elements based at least in part on the determined location of the driver's eyes.

21. A vehicular driving assist system, the vehicular driving assist system comprising:

a plurality of sensors disposed at a vehicle equipped with the vehicular driving assist system, the plurality of sensors sensing exterior of the equipped vehicle, wherein the plurality of sensors are operable to capture sensor data;

an electronic control unit (ECU) comprising electronic circuitry and associated software;

wherein sensor data captured by the plurality of sensors is transferred to and is processed at the ECU;

a head-up display disposed at the equipped vehicle, wherein the head-up display is configured to display one or more visual elements in a field of view of a driver of the equipped vehicle while the driver views forward of the equipped vehicle through a windshield of the equipped vehicle;

wherein the vehicular driving assist system, responsive to processing at the ECU of sensor data captured by the plurality of sensors and transferred to the ECU, detects another vehicle present exterior the equipped vehicle;

wherein the vehicular driving assist system, responsive at least in part to processing at the ECU of sensor data captured by the plurality of sensors, displays a plurality of visual elements via the head-up display, and wherein the plurality of visual elements comprises (i) a bounding box appearing to the driver to surround the detected other vehicle when the detected other vehicle is viewable by the driver through the windshield of the equipped vehicle, (ii) an information box appearing to visually overlay the driver's view of the detected other vehicle, wherein the information box comprises a current relative speed of the detected other vehicle relative to current speed of the equipped vehicle and (iii) a predicted trajectory of the detected other vehicle; and wherein the plurality of visual elements further comprise a plurality of markers, and wherein the plurality of markers represent a portion of an interactive game for the driver of the equipped vehicle.

22. The vehicular driving assist system of claim 21, wherein the vehicular driving assist system controls an aspect of the interactive game based on user input received from the driver of the equipped vehicle.

23. The vehicular driving assist system of claim 22, wherein, when driver-controlled steering of the equipped vehicle is electrically decoupled from controlling steering of the equipped vehicle, the user input comprises a steering wheel of the equipped vehicle.

24. The vehicular driving assist system of claim 21, wherein the vehicular driving assist system displays the plurality of visual elements based at least in part on the determined location of the driver's eyes and a determined location of the detected other vehicle relative to the equipped vehicle.

* * * * *